US009209908B2

(12) United States Patent
Yu et al.

(10) Patent No.: US 9,209,908 B2
(45) Date of Patent: Dec. 8, 2015

(54) SYSTEM AND METHOD FOR HETERODYNE COHERENT DETECTION WITH OPTIMAL OFFSET

(71) Applicant: ZTE (USA) INC., Richardson, TX (US)

(72) Inventors: Jianjun Yu, Basking Ridge, NJ (US); Ze Dong, Morristown, NJ (US); Hung-Chang Chien, Bridgewater, NJ (US)

(73) Assignee: ZTE (USA) Inc., Richardson, TX (US)

( * ) Notice: Subject to any disclaimer, the term of this patent is extended or adjusted under 35 U.S.C. 154(b) by 123 days.

(21) Appl. No.: 14/045,992

(22) Filed: Oct. 4, 2013

(65) Prior Publication Data
US 2014/0099108 A1   Apr. 10, 2014

Related U.S. Application Data

(60) Provisional application No. 61/709,496, filed on Oct. 4, 2012.

(51) Int. Cl.
  *H04B 10/06* (2006.01)
  *H04B 10/61* (2013.01)
  *H04B 10/64* (2013.01)

(52) U.S. Cl.
  CPC .............. *H04B 10/614* (2013.01); *H04B 10/64* (2013.01)

(58) Field of Classification Search
  CPC ............................ H04B 10/64; H04B 10/614
  See application file for complete search history.

(56) References Cited

U.S. PATENT DOCUMENTS

| 6,108,529 | A  | * | 8/2000  | Vice et al. ..................... 455/323 |
| 6,268,767 | B1 | * | 7/2001  | Maalej et al. ................. 329/304 |
| 6,292,598 | B1 | * | 9/2001  | Price et al. ........................ 385/2 |
| 7,209,660 | B1 | * | 4/2007  | Yee et al. ......................... 398/71 |
| 7,346,279 | B1 | * | 3/2008  | Li et al. ............................ 398/32 |
| 7,460,793 | B2 | * | 12/2008 | Taylor ........................... 398/208 |
| 7,826,752 | B1 | * | 11/2010 | Zanoni et al. ................. 398/205 |

(Continued)

OTHER PUBLICATIONS

Li et al; Building up low-complexity spectrally-efficient Terabit superchannles by receiver-side duobinary shaping; Apr. 2012; optics express vol. 20, No. 9.*

(Continued)

*Primary Examiner* — Ken Vanderpuye
*Assistant Examiner* — Ambritbir Sandhu
(74) *Attorney, Agent, or Firm* — Drinker Biddle & Reath LLP

(57) ABSTRACT

A heterodyne optical signal detector and method performed thereby, the signal detector including an optical signal spectrum shaper operable to modify the shape of the frequency spectrum of a received optical signal, a laser local oscillator (LO), and polarization beam splitters (PBSs) to divide the signal and the LO into orthogonal components, waveguides in which intermediate frequency (IF) signals are formed, balanced photodetectors (BPDs) arranged to receive the IF signals and operable to convert the IF signals into electric signals, and analog to digital converters (ADCs) that digitize the electric signals. In embodiments, the ADCs have a predetermined bandwidth, the received signal has a spectrum which, if not shaped, would produce IF signals with a bandwidth greater than that of the ADCs, the spectrum shaper modifies the received signal spectrum to produce IF signals that have a bandwidth substantially equal to half the bandwidth of the ADCs, the laser frequency is adjusted produce IF signals in the waveguides having a frequency spectrum centered at the midpoint of the ADCs' bandwidth.

4 Claims, 3 Drawing Sheets

(56) References Cited

U.S. PATENT DOCUMENTS

| | | | |
|---|---|---|---|
| 8,005,372 B2* | 8/2011 | Takahara | 398/203 |
| 8,014,686 B2* | 9/2011 | Rahn et al. | 398/205 |
| 8,301,037 B2* | 10/2012 | Pfau | 398/205 |
| 8,571,423 B2* | 10/2013 | Winzer | 398/208 |
| 8,670,678 B2* | 3/2014 | Sakamoto et al. | 398/208 |
| 8,693,897 B2* | 4/2014 | Mo et al. | 398/208 |
| 8,805,208 B2* | 8/2014 | Zhang et al. | 398/208 |
| 2004/0114939 A1* | 6/2004 | Taylor | 398/152 |
| 2005/0232644 A1* | 10/2005 | Moeller | 398/202 |
| 2006/0013590 A1* | 1/2006 | Hueda et al. | 398/149 |
| 2008/0075472 A1* | 3/2008 | Liu et al. | 398/202 |
| 2009/0074428 A1* | 3/2009 | Liu | 398/208 |
| 2010/0098436 A1* | 4/2010 | Mahgerefteh et al. | 398/192 |
| 2010/0150550 A1* | 6/2010 | Hashimoto | 398/34 |
| 2010/0215357 A1* | 8/2010 | Westlund et al. | 398/16 |
| 2011/0150503 A1* | 6/2011 | Winzer | 398/202 |
| 2011/0217918 A1* | 9/2011 | Rechberger et al. | 455/1 |
| 2011/0280587 A1* | 11/2011 | Xie | 398/202 |
| 2012/0002979 A1* | 1/2012 | Xie | 398/208 |
| 2012/0069854 A1* | 3/2012 | Suzuki | 370/465 |
| 2012/0134676 A1* | 5/2012 | Kikuchi | 398/65 |
| 2012/0288286 A1* | 11/2012 | Houtsma et al. | 398/202 |
| 2013/0071124 A1* | 3/2013 | Xie et al. | 398/82 |
| 2013/0089339 A1* | 4/2013 | Liu et al. | 398/152 |
| 2013/0209089 A1* | 8/2013 | Harley et al. | 398/25 |
| 2013/0216239 A1* | 8/2013 | Zhang et al. | 398/202 |
| 2014/0186024 A1* | 7/2014 | Randel et al. | 398/25 |
| 2014/0199068 A1* | 7/2014 | Kaneda | 398/65 |
| 2014/0241722 A1* | 8/2014 | Xie et al. | 398/65 |
| 2014/0266824 A1* | 9/2014 | Lowney et al. | 341/120 |
| 2014/0286651 A1* | 9/2014 | Takechi | 398/208 |
| 2014/0348515 A1* | 11/2014 | Tsubouchi | 398/202 |
| 2015/0063378 A1* | 3/2015 | Nebendahl | 370/537 |
| 2015/0147071 A1* | 5/2015 | Kawasoe et al. | 398/202 |
| 2015/0162991 A1* | 6/2015 | Gupta et al. | |
| 2015/0171972 A1* | 6/2015 | Xie et al. | |

OTHER PUBLICATIONS

Zhu et al; QAM coherent subcarrier multiplexing system based on heterodyne detection using intermediate frequnecy carrier modualtion; 2008; IEEE; pp. 165-168.*

Zhou, X., "Multi-Level, Multi-Dimensional Coding for High-Speed and High-Spectral-Efficiency Optical Transmission." *Journal of Lightwave Technology* 27(16), Aug. 15, 2009, pp. 3641-3653.

Ip, E. et al., "Coherent detection in optical fiber system." *Optics Express* 16(2), Jan. 21, 2008, pp. 753-791.

Zhang, S. et al., "40×117.6 GBs PDM-16QAM OFDM Transmission over 10,181 km with Soft-Decision LDPC Coding and Nonlinearity Compensation." Optical Society of America PFC/NFOEC Postdeadline Papers, PDP5C.4, 2012.

Yu, C. et al., "Phase Estimation in Coherent Optical Fiber Communication Systems with Advanced Modulation Formats." *Optical Socieity of America OFC/NFOEC Technical Digest*, Jan. 23, 2012.

Winzer, P.J. et al., "Spectrally Efficient Long-Haul Optical Networking Using 112-Gb/s Polarization-Multiplexed 16-QAM." *Journal of Lightwave Technology* 28(4), 2010, pp. 547-556.

Kazovsky, L.G., "Decision-Driven Phase-Locked Loop for Optical Homodyne Receivers: Performance Analysis and Laser Linewidth Requirements." *IEEE Transactions on Electron Devices* ED-32(12), Dec. 1985, pp. 2630-2639.

Zhang, J. et al., "Simplified coherent receiver with heterodyne detection of eight-channel 50 Gb/s PDM-QPSK WDM signal after 1040 km SMF-28 transmission." *Optics Letters* 37(19), Oct. 1, 2012, pp. 4050-4052.

Cai, J-X, et al., "20 Tbit/s Transmission Over 6860 km with Sub-Nyquist Channel Spacing." *Journal of Lightwave Technology* 30(4), Feb. 15, 2012, pp. 651-657.

Li, J. et al., "Low-Complexity Duobinary Signaling and Detection for Sensitivity Improvement in Nyquist-WDM Coherent System." *OFC/NFOEC Technical Digest*, Jan. 23, 2012.

Lubomirsky, I., "Quadrature Duobinary for High-Spectral Efficiency 100G Transmission." *Journal of Lightwave Technology* 28(1), Jan. 1, 2010, pp. 91-96.

Dong, Z., et al., "7x224 Gb/s/ch Nyquist-WDM Transmission over 1600-km SMF-28 Using PDM-CSRZ-ZPSK Modulation." *IEEE Photonics Technology Letters* 24(13), Jul. 1, 2012, pp. 1157-1159.

International Telecommunications Union, "Forward Error Correction for High Bit-Rate DWDM Submarine Systems." ITU-T Recommendation G.975.1 from Series G: Transmission Systems and Media, Digital Systems and Networks, Feb. 2004.

* cited by examiner

SYSTEM AND METHOD FOR HETERODYNE COHERENT DETECTION WITH OPTIMAL OFFSET

CROSS-REFERENCE TO RELATED APPLICATIONS

This Application claims the benefit of U.S. Provisional Application 61/709,496 filed on Oct. 4, 2012.

BACKGROUND

With the development of large-bandwidth and high-speed electronic analog-to-digital converters (ADCs) and photo detectors (PDs), coherent detection with digital signal processing (DSP) has been attracting a great deal of interest in research community. It is well known that coherent detection can include either homodyne detection or heterodyne detection. However, unlike homodyne detection, heterodyne detection can simultaneously down-convert in-phase (I) and quadrature (Q) components to an intermediate frequency (IF), thereby reducing the number of balanced PDs and ADCs of a coherent receiver by half. Furthermore, with heterodyne detection there is no need to consider the delays between the I and Q components in a polarization-division-multiplexed (PDM) signal. In addition, with heterodyne detection a conventional dual-hybrid structure is also unnecessary. Accordingly, heterodyne detection is much more hardware-efficient than homodyne detection.

However, the ADC bandwidth needed for heterodyne detection is twice that needed for homodyne detection. It is well known that in heterodyne detection there exists a frequency offset, i.e., the frequency difference between the local oscillator (LO) source and a received optical signal. Thus, in the case where the ADC bandwidth is limited and the signal spectrum is wide (e.g., larger than the ADC bandwidth), the prior art does not optimize the frequency offset for heterodyne detection, resulting in undesirable signal spectrum overlap and/or cutoff.

SUMMARY

A heterodyne optical signal detector and method performed thereby, the signal detector including an optical signal spectrum shaper operable to modify the shape of the frequency spectrum of a received optical signal, a laser local oscillator (LO), and polarization beam splitters (PBSs) to divide the signal and the LO into orthogonal components, waveguides in which intermediate frequency (IF) signals are formed, balanced photodetectors (BPDs) arranged to receive the IF signals and operable to convert the IF signals into electric signals, and analog to digital converters (ADCs) that digitize the electric signals. In embodiments, the ADCs have a predetermined bandwidth, the received signal has a spectrum which, if not shaped, would produce IF signals with a bandwidth greater than that of the ADCs, the spectrum shaper modifies the received signal spectrum to produce IF signals that have a bandwidth substantially equal to half the bandwidth of the ADCs, the laser frequency is adjusted produce IF signals in the waveguides having a frequency spectrum centered at the midpoint of the ADCs' bandwidth.

It is to be understood that both the foregoing general description and the following detailed description are exemplary and explanatory and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate disclosed embodiments and/or aspects and, together with the description, serve to explain the principles of the invention, the scope of which is determined by the claims.

In the drawings.

DETAILED DESCRIPTION

It is to be understood that the figures and descriptions provided herein may have been simplified to illustrate elements that are relevant for a clear understanding of the present invention, while eliminating, for the purpose of clarity, other elements found in typical optical signal detection systems and methods. Those of ordinary skill in the art may recognize that other elements and/or steps may be desirable and/or necessary to implement the devices, systems, and methods described herein. However, because such elements and steps are well known in the art, and because they do not facilitate a better understanding of the present invention, a discussion of such elements and steps may not be provided herein. The present disclosure is deemed to inherently include all such elements, variations, and modifications to the disclosed elements and methods that would be known to those of ordinary skill in the pertinent art.

Principle of Simplified Heterodyne Detection and Digital Post Filtering

Simplified Heterodyne Detection

Figure 1:
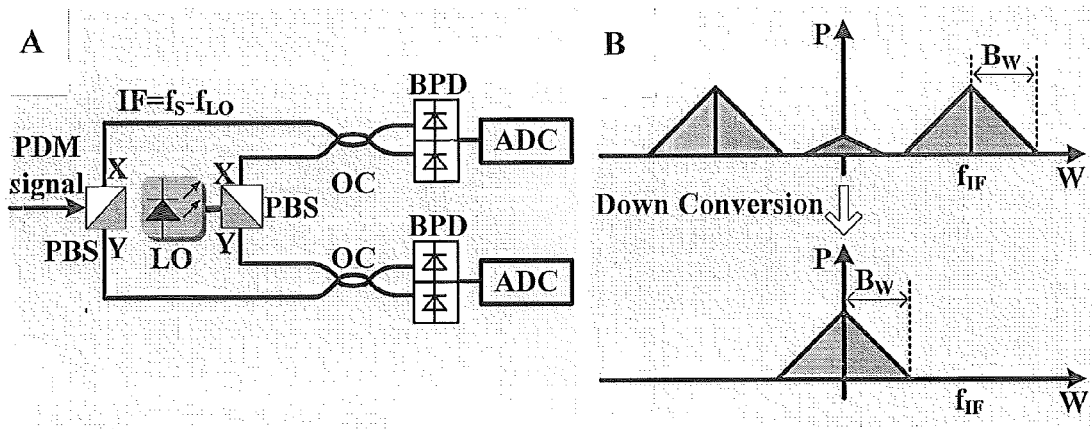
FIG. 1 inset A is a block diagram of a simplified heterodyne coherent receiver, and inset B illustrates IF down conversion in digital frequency domain.

FIG. 1A is a block diagram illustrating an exemplary heterodyne coherent receiver, and FIG. 1B illustrates intermediate frequency (IF) down conversion in the digital frequency domain. In the figure, inset A shows a simplified heterodyne coherent receiver. Inset B illustrates IF down conversion in the digital frequency domain. In the figure, the following labels are used. LO: local oscillator, PBS: polarization beam splitter, OC: optical coupler, BPD: balanced photo detector, ADC: analog-to-digital converter.

The heterodyne coherent receiver includes two polarization beam splitters (PBSs) for polarization-diversity splitting between the received optical polarization-division-multiplexing (PDM) signal and the local oscillator (LO) source, two optical couplers (OCs), two balanced photo detectors (PDs) and two analog-to-digital converters (ADCs). Only two balanced PDs and two ADCs are needed for the heterodyne detection. The polarization-diversity hybrid is also simplified in comparison to a conventional hybrid for homodyne detection. As used herein, the term "intermediate frequency" (IF) denotes the frequency offset from a received signal frequency. In-phase (I) and quadrature (Q) signal components are received simultaneously, centered at the IF, as shown in FIG. 1B wherein $f_{IF}$ denotes the IF, and $B_W$ the bandwidth of the I or Q component. In order to separate the I and Q components without crosstalk, $f_{IF} \geq B_W$ should be satisfied. The IF can be down-converted to the baseband frequency in the digital frequency domain. After polarization-diversity splitting, the received optical signal of the X-polarization state can be expressed as $$E_S(t)=\sqrt{P_S}\exp[j2\pi f_S t+\phi_S(t)]. \quad (1)$$

where $P_S$, $f_S$ and $\phi_S$ are the power, carrier frequency, and phase, respectively, of the received optical signal of X-polarization state. Similarly, the LO source of the X-polarization state can be expressed as $$E_{LO}(t)=\sqrt{P_{LO}}\exp[j2\pi f_{LO}t+\phi_{LO}(t)]. \quad (2)$$

where $P_{LO}$, $f_{LO}$ and $\phi_{LO}$ are the power, carrier frequency, and phase of the LO source of X-polarization state, respectively.

f the bandwidth of the ADCs and PDs is large enough, after balanced photodetection the generated electrical signal of X-polarization state consists of both the baseband and IF components carrying the entire I and Q components. This is expressed as $$I_{BPD}(t)=P_S+P_{LO}+2R\sqrt{P_S P_{LO}}\exp[j2\pi f_{IF}t+\phi_{IF}(t)].$$

$$f_{IF}=f_S-f_{LO};$$

$$\phi_{IF}(t)=\phi_S(t)-\phi_{LO}(t). \quad (3)$$

where R is the PD responsivity, and $f_{IF}$ and $\phi_{IF}$ denote the frequency and phase of the IF component, respectively. The output current of balanced PD for Y-polarization state is similar to Eq. 3. By multiplying a proper transfer function, the extracted IF component can be expressed as $$E_{IF}(t)=2R\sqrt{P_S P_{LO}} \cdot [I(t) \cdot \cos(2\pi f_{IF}t+\phi_{IF}(t))+Q(t) \cdot \sin(2\pi f_{IF}t+\phi_{IF}(t))]. \quad (4)$$

where I(t) and Q(t) denote the I and Q components of the received optical PDM signal, respectively. By re-choosing the zero-frequency point of Eq. (4), the IF component can be down-converted to the baseband by simple frequency shifting. Compared to the external IF down conversion based on frequency beating with electrical mixer and radio-frequency (RF) signal, basic operation in the digital frequency domain is much more hardware-efficient.

Assume $\zeta$ is the noise density of a signal. The signal-to-noise ratio (SNR) for heterodyne detection is $$SNR_{He}=\frac{S_{He}}{N_{He}}=\frac{2\times 0.5 I_{BPD}^2}{2B_W\zeta}=2P_S P_{LO} R^2/B_W\zeta. \quad (5)$$

In contrast, for homodyne detection satisfying $f_{IF}=0$, a conventional 2×4 optical 90° hybrid is needed. In that case, the I or Q component of the signal can be expressed as $$I_{BPD\_i/q}=2R\sqrt{P_S P_{LO}}\cos[\phi_S(t)-\phi_{LO}(t)]. \quad (6)$$

As a result, the SNR for homodyne detection is $$SNR_{Ho}=\frac{S_{Ho}}{N_{Ho}}=\frac{I_{BPD\_i/q}^2}{B_W\zeta}=4P_S P_{LO}R^2/B_W\zeta. \quad (7)$$

Thus, homodyne detection has a 3-dB SNR improvement compared to heterodyne detection. But homodyne detection cannot use the simplified optical 180° hybrid described previously with regard to heterodyne detection, and cannot use only two balanced PDs and two ADCs without destroying I and Q information.

Optimal Frequency Offset and Spectrum Shaping with Digital Post Filtering

Figure 2:
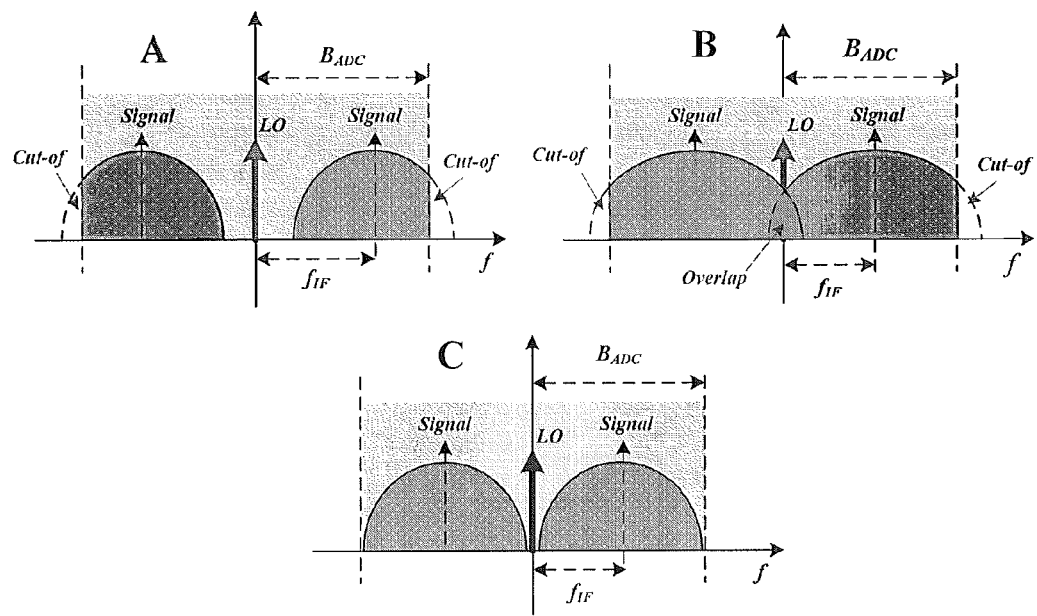
FIG. 2 shows optimal frequency offset and spectrum shaping for heterodyne coherent detection in accordance with the disclosure.

FIG. 2 illustrates the effects of frequency offset and spectrum shaping on heterodyne coherent detection. Due to the bandwidth limit of an ADC in practice, the frequency offset between the LO signal and the received signal should not be too large. As shown in FIG. 2A, the signal spectrum beyond the ADC bandwidth ($B_{ACD}$) may be cut off when a large frequency offset ($f_{IF}$) is used. To prevent such cutoff, the signal spectrum may be shaped to fall within the ADC bandwidth. As shown in FIG. 2B, both spectrum overlap and cut-off may occur when the signal is not spectrum shaped and is larger than the ADC bandwidth. Accordingly, spectrum shaping can be used in conjunction with adjusting the frequency offset to achieve an optimal high speed heterodyne coherent detection. FIG. 2C illustrates an optimized frequency offset and spectrum shaped signal. As shown, when the frequency offset and spectrum shape are optimized, the received signal uses the entire available ADC bandwidth without any cut off of the signal spectrum beyond the $B_{ADC}$, and without any spectrum overlap. As shown, the spectrum shape is optimized when the shaped signal bandwidth is half the ADC bandwidth, and the frequency offset is optimized when the shaped signal spectrum utilizes the entire ADC bandwidth with no spectrum cut off or overlap.

Duo-binary signaling or correlative coding is a specific class of partial response signaling that has only 1-bit memory length, and that introduces a controlled amount of inter-symbol interference (ISI) into the signal, rather than trying to eliminate ISI as is common. The introduced ISI can be compensated for by using digital signal processing in the digital domain at the receiver. The ideal symbol-rate packing of 2 symbols per Hertz can then be achieved without encountering the requirements for unrealizable optical filters based on the Nyquist theorem. Multi-symbol optimal decision schemes, such as maximum-a-posteriori probability (MAP) estimation, maximum likelihood sequence estimation (MLSE), and the like, can take advantage of symbol correlation that exists in received partial response signals. The challenge is that the number of states and transitions grows exponentially with increasing memory length. For instance, an adopted MLSE length of 10 results in 410 states and 411 transitions in lane-dependent PDM-QPSK signals. Consequently, computational complexity significantly increases in practical implementations.

Figure 3:
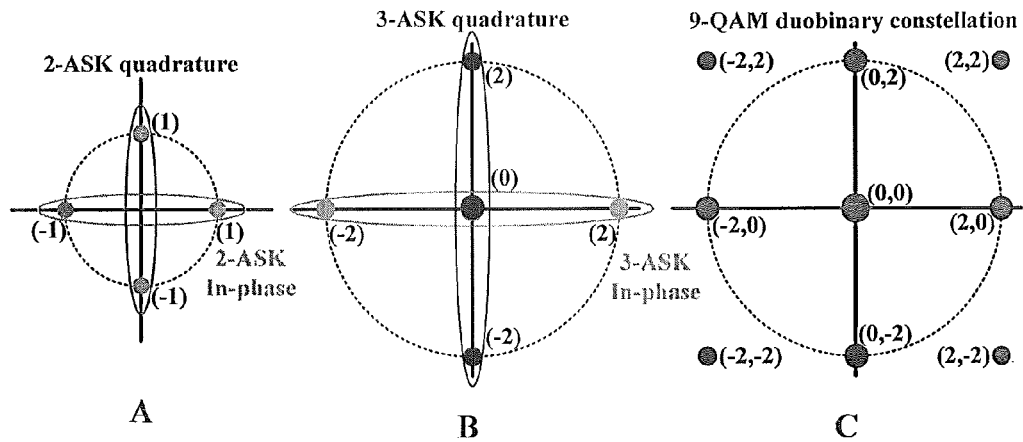
FIG. 3 illustrates the evolution of 9-QAM signal generation by digital post filtering.

Moreover, in a bandwidth-limiting optical coherent system, noise in high frequency components of the signal spectrum and inter-channel crosstalk may both be made worse by using a conventional linear equalization algorithm, such as the conventional constant modulus algorithm (CMA), for example. However, in embodiments, a linear digital delay-and-add finite impulse response (FIR) post filter provides a simple way to achieve partial response that can effectively mitigate the enhanced inter-channel crosstalk and intra-channel noise introduced by an adaptive equalizer. At the coherent receiver, the post filter is added after carrier phase estimation (CPE) in the conventional DSP process. From the constellation point of view, the effect of the post filter transforms the 4-point QPSK signal into 9-point quadrature duo-binary one. The evolution of this transformation is illustrated in FIG. 3. As a result of the delay-and-add effect, the 2-ary amplitude shift keying (2-ASK) I and Q components disappear and are then independently converted into two 3-ASK symbol series.

The mechanism for the generation of '9-QAM' signals can be considered as the superposition of the two 3-ASK vectors on a complex plane. In FIG. 3, the size of constellation points represents the relative number of points generated after the post filter.

The adoption of the post filter also makes possible the use of MLSE with just a 1-bit memory length, which can effect further error correction that may be induced by ISI.

Figure 4:
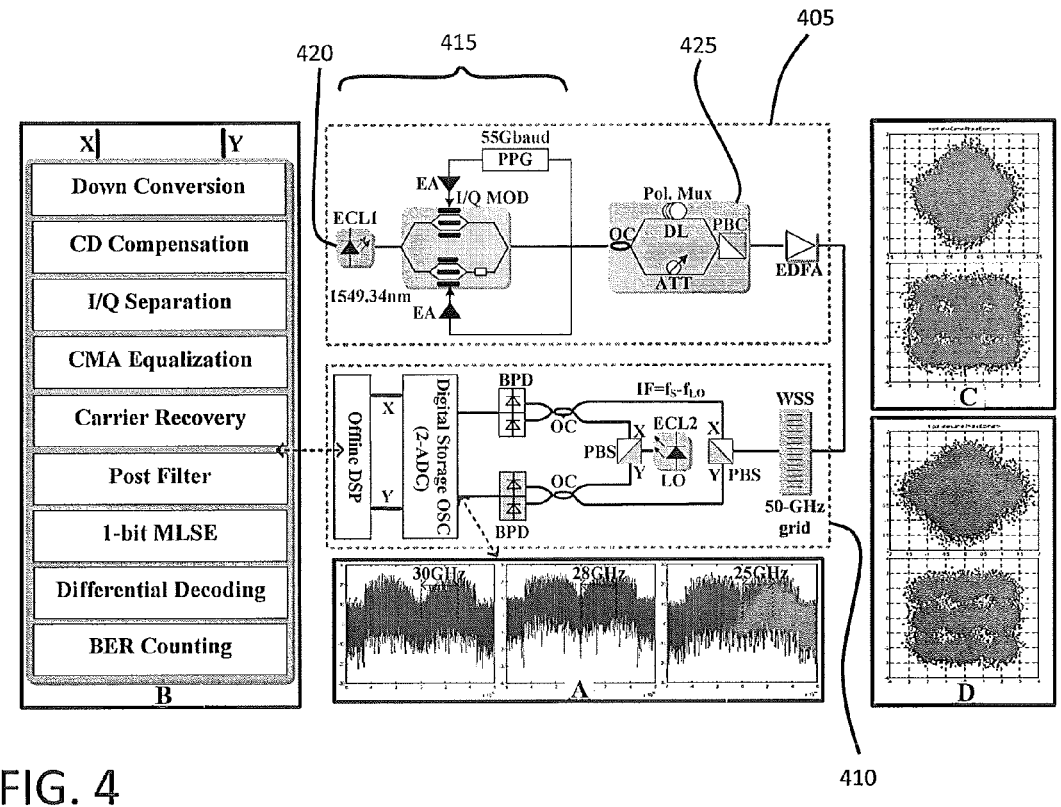
FIG. 4 is a block diagram of an exemplary setup for the generation and heterodyne detection of a 220-Gb/s single-channel PDM-QPSK signal on a 50-GHz grid with post filter and 1-bit MLSE, in accordance with the disclosure.

Optimal Frequency Offset in a 55-Gbaud PDM-QPSK Single Channel on a 50-GHz Grid with Simplified Heterodyne Detection FIG. 4 shows an exemplary setup for the generation, 405, and heterodyne detection, 410, of a 220-Gb/s single-channel PDM-QPSK signal on a 50-GHz grid with post filter and 1-bit MLSE. In FIG. 4, inset A shows the electrical spectra for the Y-polarization component centered on 30, 28, and 25 GHz obtained after balanced detection. Inset B shows the detailed DSP after analog-to-digital conversion. Inset C shows the received constellations corresponding to 25-GHz frequency offset after CPE and further post filtering for the X-polarization state, while inset D shows the Y-polarization state. In the figure, the following labels are used. ECL: external cavity laser, PPG: pulse pattern generator, I/Q MOD: I/Q modulator, EA: electrical amplifier, OC: optical coupler, DL: delay line, ATT: optical attenuator, PBC: polarization beam combiner, EDFA: Erbium-doped fiber amplifier, WSS: wavelength selective switch, PBS: polarization beam splitter, LO: local oscillator, BPD: balanced photo detector, OSC: oscilloscope.

At transmitter 415, a continuous-wavelength (CW) lightwave at 1549.34 nm from external cavity laser (ECL) 420, with linewidth less than 100 kHz and maximum output power of 14.5 dBm, is modulated by an I/Q modulator (I/Q MOD). The I/Q modulator is driven by a 55-Gbaud electrical binary signal, which, with a pseudo-random binary sequence (PRBS) length of $2^{15}-1$, is generated from an electrical dual-channel pulse pattern generator (PPG). For optical QPSK modulation, two parallel Mach-Zehnder modulators (MZMs) in the I/Q modulator are both biased at the null point and driven at the full swing to achieve zero-chirp 0- and $\pi$-phase modulation. The phase difference between the upper and lower branches of the I/Q modulator is controlled at $\pi/2$. Subsequent polarization multiplexing is effected by polarization multiplexer 425, comprising a polarization-maintaining optical coupler (OO) to halve the signal into two branches, an optical delay line (DL) to provide a 150-symbol delay, an optical attenuator (ATT) to balance the power of the two branches, and a polarization beam combiner (PBC) to recombine the signal. The signal is then power-amplified by an Erbium-doped fiber amplifier (EDFA) for transmission. Thereafter, the 220-Gb/s PDM-QPSK single channel is spectrally shaped by a programmable wavelength selective switch (WSS) on a 50-GHz grid.

At the receiver, another laser (ECL2) with linewidth less than 100 kHz is used as the LO source, which has a large frequency offset relative to the received optical signal. Two polarization beam splitters (PBSs) and two OCs are used to realize polarization diversity of the received signal with the LO source in optical domain before balanced PDs each with 50-GHz bandwidth. Analog-to-digital conversion is realized in a real-time digital storage oscilloscope (OSC) with 120-GSa/s sampling rate and 45-GHz electrical bandwidth. Two ADC channels provide for offline DSP.

In the receiver, the received signals are down-converted to the baseband by frequency shifting. The digital IF down conversion is described in detail hereinafter. A T/2-spaced time-domain FIR filter is then used for CD compensation, where the filter coefficients are calculated from the known fiber CD transfer function using the frequency-domain truncation method. I and Q components are then separated by multiplying synchronous cosine and sine functions, which are generated from a digital LO for down conversion. Then, two complex-valued, 13-tap, T/2-spaced adaptive FIR filters, based on classic CMA, are used to retrieve the modulus of the PDM-QPSK signal and realize polarization de-multiplexing. The subsequent step is carrier recovery, which includes residual frequency-offset estimation and CPE. The former is based on a fast Fourier transform (FFT) method, while the latter is based on a fourth-power Viterbi-Viterbi algorithm. A post filter is then adopted to convert the binary signal to a duo-binary one. The final symbol decision is based on a 1-bit MSLE. Finally, differential decoding is used to eliminate $\pi/2$ phase ambiguity before bit-error rate (BER) counting. In this exemplary embodiment, the BER is counted over 10×106 bits (10 data sets, and each set contains 106 bits).

Figure 5:
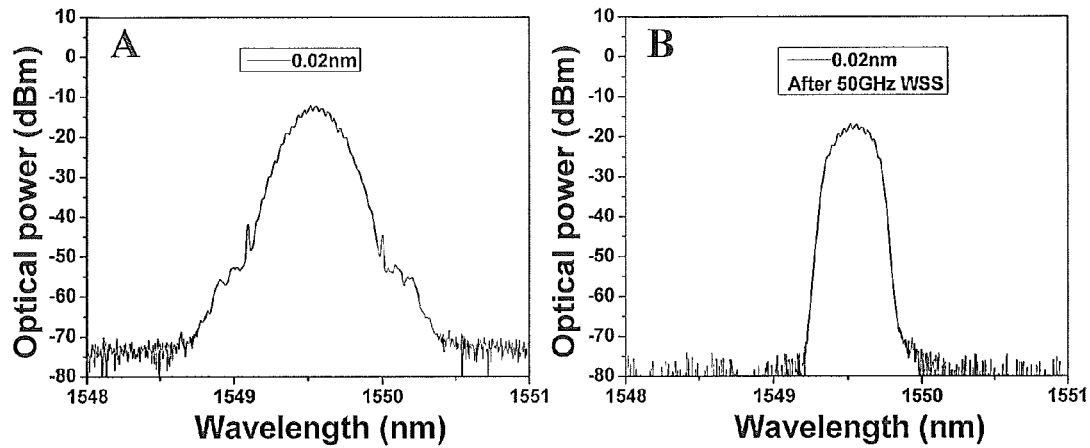
FIG. 5 shows optical spectra before and after spectral shaping by a programmable wavelength selective switch, in accordance with the disclosure.

FIG. 5 shows the optical spectra (0.02-nm resolution) for the PDM-QPSK single channel at 1549.34 nm before A and after B the 50-GHz WSS. It can be seen that the optical spectrum becomes much narrower after WSS.

Figure 6:
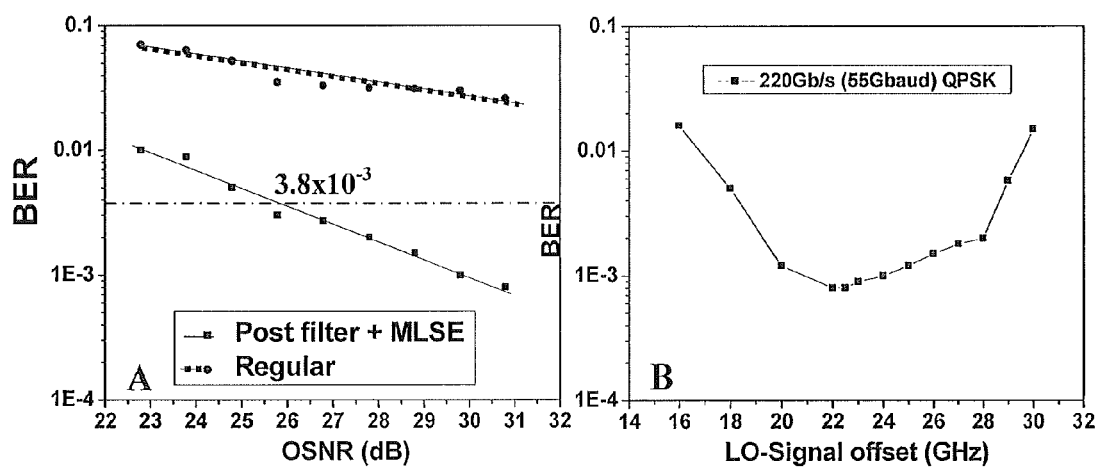
FIG. 6 inset A is a graph of back-to-back (BTB) bit error rate (BER) versus optical signal to noise ratio with and without post filter and 1-bit MLSE in accordance with the disclosure, and inset B is a graph of BTB BER versus frequency offset when the OSNR is set at 32 dB.

Referring now to FIG. 6, for the exemplary 220-Gb/s PDM-QPSK single channel at 1549.34 nm, inset A shows the measured back-to-back (BTB) BER versus the optical SNR (OSNR) with and without the technique of post filter and 1-bit MLSE, while inset B shows the measured BTB BER versus the frequency offset when the OSNR is set at 32 dB. It can be seen from inset A that, after adopting post filter and 1-bit MLSE, the BER performance is much better and the BER is less than the pre-forward-error-correction (pre-FEC) limit of $3.8 \times 10^{-3}$ when the OSNR is over 25.6 dB. From inset B, it can be seen that the optimum BER performance is attained when the frequency offset is 22~23 GHz, i.e., half of the ADC bandwidth.

The herein disclosed apparatus, systems, and methods can be used to detect optical signals that were generated using any type of phase-shift keying (PSK) or quadrature amplitude modulation (QAM) modulation scheme, such as 4PSK, 8PSK, 16PSK, 4QAM, 8QAM, 16QAM, 64QAM, 256QAM, 1024QAM, 4096QAM, or higher order schemes, Offset Quadrature PSK (OQPSK), Differential PSK (DPSK), or any other variant of PSK or QAM.

Although the invention has been described and illustrated in exemplary forms with a certain degree of particularity, it is noted that the description and illustrations have been made by way of example only. Numerous changes in the details of construction and combination and arrangement of parts and steps may be made. Accordingly, such changes are intended to be included in the invention, the scope of which is defined by the claims.

What is claimed is:

1. A heterodyne optical signal detector, comprising:
an optical signal spectrum shaper operable to modify the shape of the frequency spectrum of a received optical signal;
a first polarization beam splitter (PBS) optically coupled to the spectrum shaper and operable to divide the signal with shaped spectrum into orthogonal X and Y components;
a laser generator operable to generate laser light as a local oscillator (LO) signal;
a second polarization beam splitter optically coupled to the laser generator and operable to divide the LO signal into orthogonal X and Y components;
a pair of optical waveguides arranged to receive the signal X and Y components, respectively, from the first PBS, and the LO X and Y components, respectively, from the second PBS, and in which are formed X and Y component intermediate frequency (IF) signals, respectively, equal to the difference between the signal frequency and the LO frequency;
a pair of optical couplers (OCs) arranged to receive the IF X and Y components, respectively;
two sets of balanced photodetectors (BPDs) arranged to receive the IF X and Y components, respectively, and operable to convert the IF X and Y components into X and Y electric signals, respectively;
a pair of analog to digital converters (ADCs) arranged to receive the X and Y electric signals, respectively, and convert them into X and Y digital signals; and
wherein:
the ADCs have a predetermined bandwidth;
the received signal has a spectrum which, if not shaped, would produce IF signals with a bandwidth greater than that of the ADCs;
the spectrum shaper modifies the received signal spectrum to produce IF X and Y components that have a bandwidth substantially equal to half the bandwidth of the ADCs; and
the laser frequency is adjusted produce IF X and Y components in the waveguides having a frequency spectrum centered substantially at the midpoint of the ADCs' bandwidth;
an optical signal interface optically coupled to the optical signal spectrum shaper and arranged to receive the optical signal from an optical grid; and
a digital signal processor (DSP) arranged to receive and process the X and Y digital signals;
wherein the received optical signal was generated using one of a phase shift keying (PSK) modulation scheme and a quadrature amplitude modulation (QAM) modulation scheme; and
wherein the DSP implements a digital post filter combined with 1-bit maximum likelihood sequence estimation (MLSE) to identify symbols in the received optical signal; and
wherein the DSP further implements:
frequency shifting to down-convert the X and Y digital signals to a baseband;
a T/2-spaced time-domain finite impulse response (FIR) filter for circular dichroism (CD) compensation, where the filter coefficients are calculated from the known fiber CD transfer function using the frequency-domain truncation method;
multiplying synchronous cosine and sine functions generated from a digital LO generated for the down conversion, to separate I and Q components;
two complex-valued, 13-tap, T/2-spaced adaptive finite impulse response (FIR) filters based on the constant modulus algorithm (CMA), to retrieve the modulus of the optical signal and realize polarization de-multiplexing;
carrier recovery, including residual frequency-offset estimation based on a fast Fourier transform (FFT) method and carrier phase estimation (CPE) based on a fourth-power Viterbi-Viterbi algorithm; and
bit error rate (BER) counting;
wherein the post filter is adapted to convert a binary signal of the recovered carrier to a duo-binary one; and
wherein differential decoding is used to eliminate π/2 phase ambiguity before the bit-error ratio (BER) counting.

2. The signal detector of claim 1, wherein the spectrum shaper comprises a wavelength selective switch.

3. A method of detecting an optical signal, comprising:
modifying, with an optical signal spectrum shaper, the shape of the frequency spectrum of a received optical signal;
dividing, with a first polarization beam splitter (PBS), the signal with shaped spectrum into orthogonal X and Y components;
generating, with a laser generator, laser light as a local oscillator (LO) signal;
dividing, with a second polarization beam splitter, the LO signal into orthogonal X and Y components;
receiving, via a pair of optical waveguides, the signal X and Y components, respectively, from the first PBS, and the LO X and Y components, respectively, from the second PBS, wherein X and Y component inter mediate frequency (IF) signals are formed in the waveguides that are equal to the difference between the signal frequency and the LO frequency;
receiving, in a pair of optical couplers (OCs), the IF X and Y components, respectively;
converting, with two sets of balanced photodetectors (BPDs), the IF X and Y components into X and Y electric signals, respectively;
converting, with a pair of analog to digital converters (ADCs), the X and Y electric signals, respectively, into X and Y digital signals;
wherein:
the ADCs have a predetermined bandwidth;
the received signal has a spectrum which, if not shaped, would produce IF signals with a bandwidth greater than that of the ADCs;
the spectrum shaper modifies the received signal spectrum to produce IF X and Y components that have a bandwidth substantially equal to half the bandwidth of the ADCs; and
the laser frequency is adjusted produce IF X and Y components in the waveguides having a frequency spectrum centered substantially at the midpoint of the ADCs' bandwidth;
processing, with a digital signal processor (DSP), the X and Y digital signals;
wherein the received optical signal is received from an optical grid; and
wherein the received optical signal was generated using one of a phase shift keying (PSK) modulation scheme and a quadrature amplitude modulation (QAM) modulation scheme;
the method further comprising:
implementing, in the DSP, a digital post filter combined with 1-bit maximum likelihood sequence estimation (MLSE) to identify symbols in the received optical signal;
frequency shifting to down-convert the X and Y digital signals to a baseband;
compensating for circular dichroism (CD) using a T/2-spaced time-domain finite impulse response (FIR) filter, where the filter coefficients are calculated from the known fiber CD transfer function using the frequency-domain truncation method;
multiplying synchronous cosine and sine functions generated from a digital LO generated for the down conversion, to separate I and Q components;
retrieving a modulus of the optical signal and realizing polarization de-multiplexing using two complex-valued, 13-tap, T/2-spaced adaptive finite impulse response (FIR) filters based on the constant modulus algorithm (CMA);

recovering a carrier signal, including residual frequency-offset estimation based on a fast Fourier transform (FFT) method and carrier phase estimation (CPE) based on a fourth-power Viterbi-Viterbi algorithm; and counting a bit error rate (BER);

wherein the digital post filter is adapted to convert a binary signal of the recovered carrier to a duo-binary one; and wherein differential decoding is used to eliminate $\pi/2$ phase ambiguity before the bit-error ratio (BER) counting.

4. The method of claim 3, wherein the spectrum shaper comprises a wavelength selective switch.

* * * * *